UNITED STATES PATENT OFFICE.

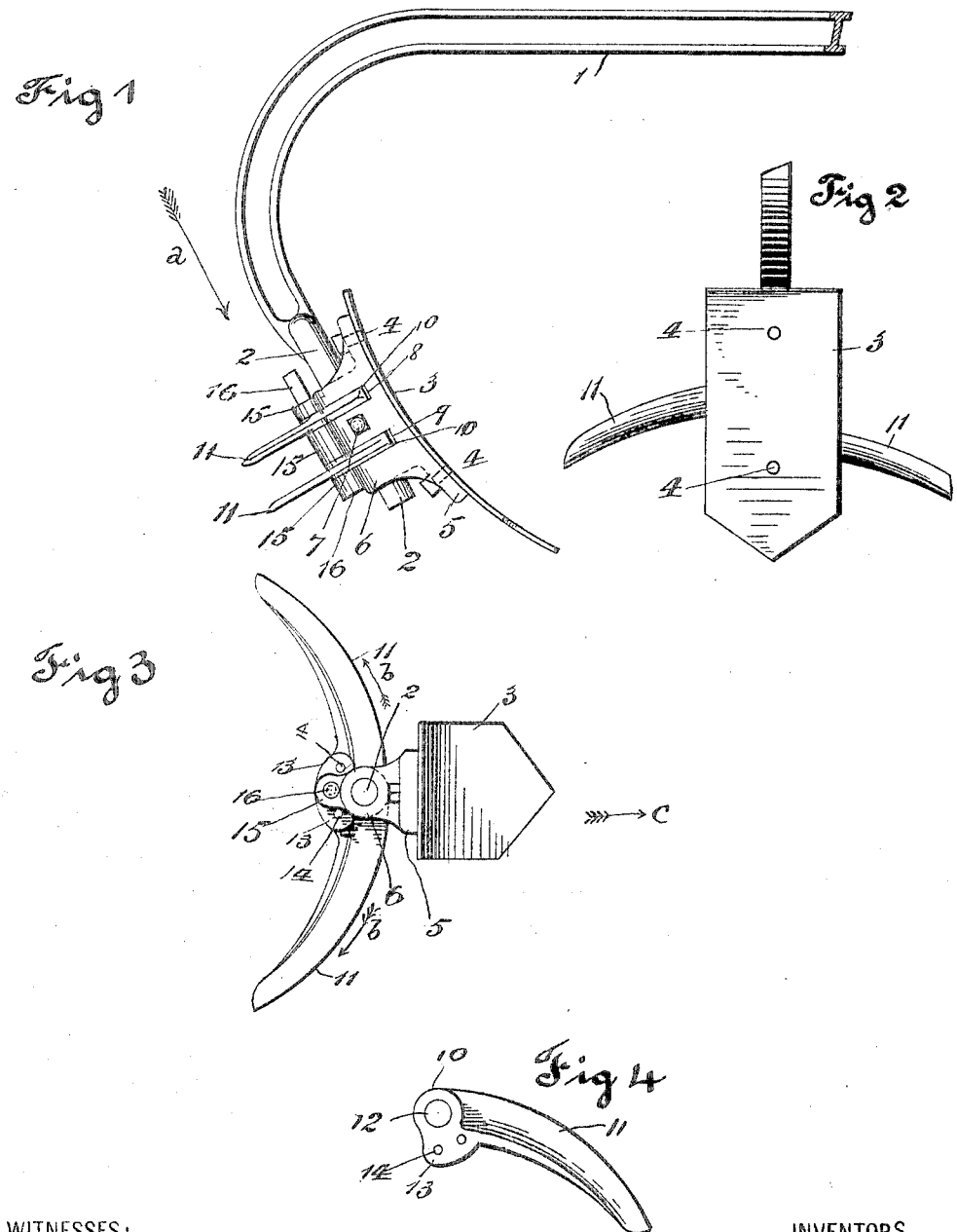

JOHN E. LONG AND HOWARD A. STEPHENS, OF INDIANAPOLIS, INDIANA.

WEED-CUTTER FOR CULTIVATORS.

No. 804,418.	Specification of Letters Patent.	Patented Nov. 14, 1905.

Application filed August 7, 1905. Serial No. 273,149.

*To all whom it may concern:*

Be it known that we, JOHN E. LONG and HOWARD A. STEPHENS, citizens of the United States of America, residing at Indianapolis, in the county of Marion and State of Indiana, have invented certain new and useful Improvements in Weed-Cutters for Cultivators, of which the following is a specification, reference being had therein to the accompanying drawings.

This invention relates to a weed-cutter attachment for cultivators hereinafter described, and particularly pointed out in the claims.

The object of this invention is to provide shovels of cultivators with weed-cutting knives, which knives are situated in a position below the ground to the rear of the shovels of cultivators best adapted to cut the weeds off below the ground.

A further object of this invention is to provide means whereby the knives when they come in contact with an unyielding material—such as rocks, stumps, or very thick tough weeds that the knives would be incapable of cutting—will recede or yield to permit the cultivator to be drawn or moved without breaking or injuring the weed-cutting knives.

We attain these objects by means of the knife attachment illustrated in the accompanying drawings, in which similar numerals designate like parts throughout the several views.

Figure 1 is a side elevational view of a cultivator-shovel attached to its carrying-bar. Fig. 2 is a front elevation of the same, showing the knives projecting from the rear sides thereof. Fig. 3 is a view of the cultivator-shovel with the weed-cutting knives attached and looking in the direction of the arrow *a*, (see Fig. 1,) and Fig. 4 is a detail view of one of the knives.

The shovel-carrying bar or beam 1 is provided with the downwardly-extending cylindrical stem 2. The shovel 3 is secured in any suitable manner, as by the bolts 4, to the saddle 5. The saddle 5 is provided with the sleeve 6, which is bored to receive the cylindrical stem 2, and said sleeve is secured in position on said stem 2 by a set-screw 7. The sleeve 6 is provided with the upper and lower knife-receiving slots 8 and 9, in which are fitted the bossed ends 10 of the upper and lower knives 11. The bossed ends 10 of the knives 11 are provided with the bores 12, which are adapted to fit on the cylindrical stem 2, so that the knives 11 may be revolved a limited distance on said stem 2. A segmental integral portion 13 is formed on each of the knives, and the same is provided with the graduated bores 14, which are at equal radial distances from the center of the bores 12.

Extending longitudinally back of the sleeve 6 is the boss 15, which is provided with the longitudinal bore adapted to register with either of the bores 14 of the knives, and the same is provided for the purpose of applying a pin 16, of wood or other easily-fractured material, therein to yieldingly retain the knives 11 in their respective positions relative to the shovel.

It will be readily seen that the knives when brought suddenly into contact with an unyielding obstruction, the pin being of a fragile nature, will be broken or sheared by the shearing force brought to bear upon it by the knife, and the knife will revolve on the cylindrical stem 2 to recede from the obstruction, thereby preventing the breaking of the knives. All that is necessary for the operator to do to resume operations after an occurrence of such a character is to trim a piece of wood to the desired size and again insert it into the bore of the boss 15 to retain the knives 11 in their respective positions to operate as before.

The knives 11 of the cultivator are curved rearwardly from the face of the shovel to which they are applied, so that when the cultivator is moving in the direction of the arrow *c*—that is, in a forwardly direction—the knives will cause the weeds with which they come in contact to draw along the edges of the knives in the direction of the arrows *b* to more effectually sever the stems thereof.

Having thus fully described this our invention, what we claim as new and useful, and desire to cover by Letters Patent of the United States therefor, is—

1. In a weed-cutting means for cultivators, the combination with a depending plow-supporting stem, a plow-saddle and the sleeve thereof provided with a longitudinally-extending stem-receiving bore and a knife-receiving notch formed transversely of said sleeve, of a knife situated in said notch and pivoted on said stem, and means for yieldingly maintaining said knife in position.

2. In a weed-cutting means for cultivators, the combination with a depending plow-supporting stem, a plow-saddle and the sleeve thereof provided with a longitudinally-extending stem-receiving bore and a knife-receiving notch formed transversely of said sleeve, of a knife having its cutting edge curved to recede, and means for yieldingly maintaining said knife in position.

3. In a weed-cutting means for cultivators, the combination with a depending plow-supporting stem, a plow-saddle and a vertically-extending sleeve situated to the rear of said saddle and provided with a longitudinally-extending stem-receiving bore and knife-receiving notches formed transversely of the bore of said sleeve, of knives, having forward receding curved edges, situated in said notches to extend outwardly from the sides of said sleeve, and means for yieldingly maintaining said knives in their relative positions.

4. In a weed-cutting means for cultivators, the combination with a depending plow-supporting stem, a plow-saddle and the sleeve thereof provided with a longitudinally-extending stem-receiving bore, a longitudinally-extending boss situated integral on the rear of said sleeve provided with a longitudinally-extending retaining-pin-receiving bore and a knife-receiving notch extending transversely of said boss and sleeve, of a knife situated in said notch and pivoted on said stem, a segmental portion extending partially around the bore of said knife and provided with a plurality of bores adapted to register with the bore of said retaining-pin boss, and a retaining-pin constructed of a material weaker than said stem.

5. In a weed-cutting means for cultivators, the combination with a depending plow-supporting stem, a plow-saddle and the sleeve thereof provided with a longitudinally-extending-stem-receiving bore, a longitudinally-extending boss formed integral on the rear of said sleeve provided with a longitudinally-extending retaining-pin-receiving bore, and a plurality of knife-receiving notches extending transversely of said boss and sleeve, of knives situated in said notches and pivoted on said stem to extend downwardly from the sides and to the rear of the shovel of the plow, a segmental portion extending partially around the bores of said knives and provided with a plurality of bores situated radially of said knife-bores and adapted to register with said longitudinally-extending retaining-pin-receiving bore, and a retaining-pin constructed of a material weaker than said stem.

In testimony whereof we affix our signatures in presence of two witnesses.

JOHN E. LONG.
HOWARD A. STEPHENS.

Witnesses:
THOMPSON R. BELL,
FLORENCE GIMBEL.